United States Patent [19]

Fukuda et al.

[11] 3,975,148
[45] Aug. 17, 1976

[54] APPARATUS FOR CALCINING CEMENT

[75] Inventors: Yoshiharu Fukuda, Tokyo; Yoshihiko Ueda, Musahino, both of Japan

[73] Assignee: Onoda Cement Company, Ltd., Japan

[22] Filed: Feb. 4, 1975

[21] Appl. No.: 547,088

[30] Foreign Application Priority Data

Feb. 19, 1974 Japan................................ 49-19352

[52] U.S. Cl................................. 432/106; 432/58
[51] Int. Cl.²................................................ F27B 7/02
[58] Field of Search............. 432/106, 111, 108, 80, 432/58; 34/57 R; 106/100

[56] References Cited
UNITED STATES PATENTS

| | | | |
|---|---|---|---|
| 3,452,968 | 7/1969 | Shimizu et al. | 34/57 R |
| 3,834,860 | 9/1974 | Fukuda et al. | 432/58 |
| 3,869,248 | 3/1975 | Hirai et al. | 432/106 |
| 3,881,862 | 5/1975 | Nishida et al. | 432/106 |
| 3,891,382 | 6/1975 | Lawall et al. | 432/106 |
| 3,891,383 | 6/1975 | Kobayashi | 432/106 |

*Primary Examiner*—John J. Camby
*Assistant Examiner*—Henry C. Yuen
*Attorney, Agent, or Firm*—Wenderoth, Lind & Ponack

[57] ABSTRACT

This invention relates to an apparatus for calcining cement having a suspension preheater containing an auxiliary furnace in the preheater part, characterized in that said apparatus has an adjustable throttle positioned between a kiln and a mixing chamber where a combustion gas from the kiln and a combustion gas from the auxiliary furnace are joined and mixed with each other, said adjustable throttle comprising a quadrilateral flue where at least one of the walls is movable in order to control the amount of combustion gas from the kiln.

1 Claim, 4 Drawing Figures

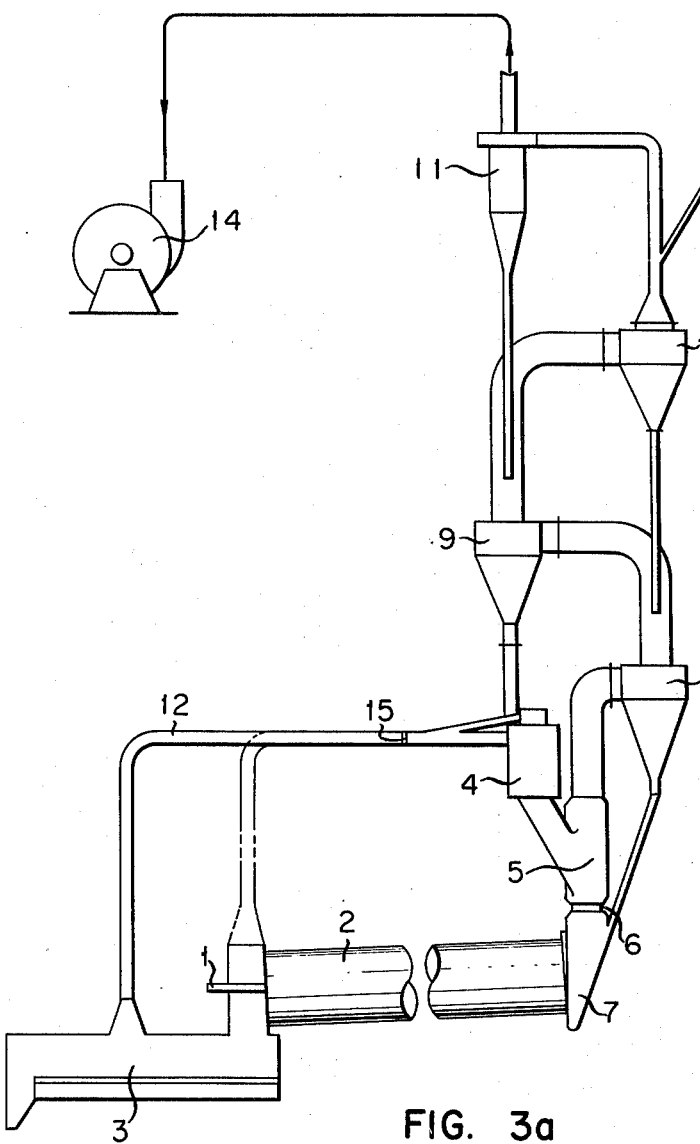
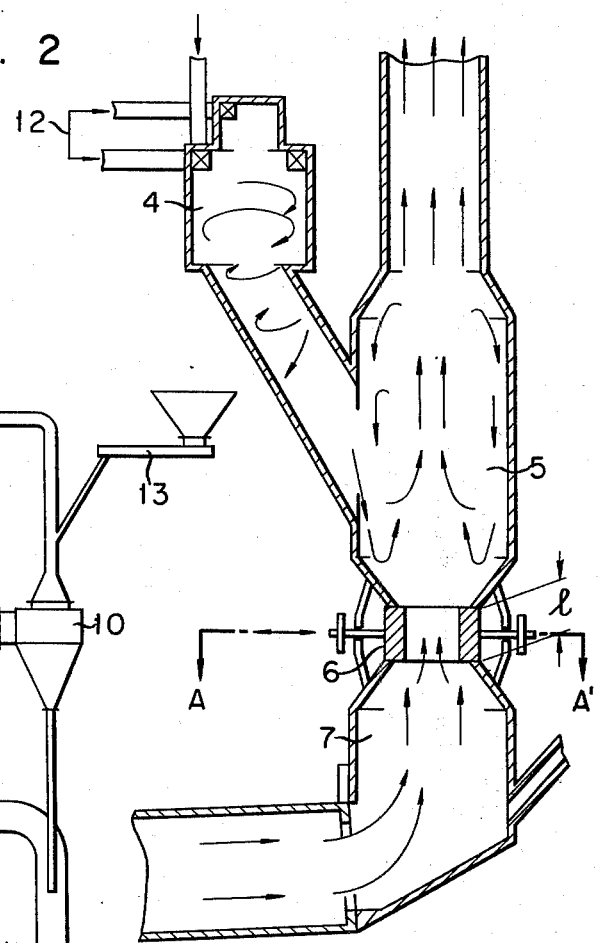
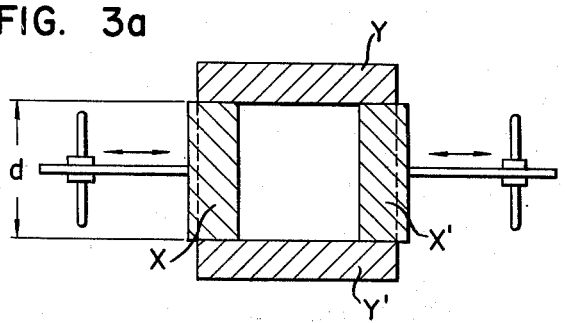

APPARATUS FOR CALCINING CEMENT

DETAILED DESCRIPTION OF INVENTION

This invention relates to an apparatus for calcining cement having a preheater equipped with an auxiliary furnace.

Recently, in drying, heating or calcining powdery material, an apparatus which efficiently heat-exchanges by suspending the powdery material in a high temperature combustion gas has been widely used. In cement industries, a cement-calcining apparatus equipped with a suspension preheater which efficiently conducts a heat-exchange between cement material and an exhaust gas from a kiln by suspending the cement material in the exhaust gas has been widely employed. However, more recently, a cement-calcining apparatus having an auxiliary furnace equipped in a preheater part to carry out heating and calcination of cement material simultaneously with combustion of fuel has been developed.

In operating such a calcining apparatus equipped with a suspension preheater having an auxiliary furnace, fuel is burnt in a furnace simultaneously exchanging heat with cement material, thereby increasing the degree of decarbonation of the cement material and the specific throughout of inner volume of kiln, and reducing damage to the brick lining which is often caused in a large scale apparatus. Thus, an economical improvement can be expected. In such a cement-calcining apparatus, two furnaces are equipped in one system and it is necessary to make a balanced draft between the two furnaces in order to induce a combustion gas from these furnaces by a preheater exhaust gas fan. Heretofore, for this operation, a fixed throttle has been equipped in the kiln inlet housing to make a balance between the amount of combustion gas from the kiln and the combustion gas from an auxiliary furnace. However, such a fixed throttle is stationary and therefore it is impossible to change the sectional area of the throttle during operation. Consequently, it is difficult to make a balanced draft when the burning ratio between a kiln and an auxiliary furnace is desired to be changed. For example, if the amount of exhaust gas from the auxiliary furnace is increased, the amount of exhaust gas from the kiln is also increased automatically and the air ratio in the kiln becomes superfluous, which is undesirable in view of heat economy. On the other hand, if the amount of exhaust gas from the kiln is limited by designing a small sectional area for the throttle, when air extracted from a kiln cooler into an auxiliary furnace is controlled by a damper equipped in a duct to restrict the amount of combustion gas in the auxiliary furnace, the draft resistance of the whole draft system is increased and this results in an undesirable effect from a power viewpoint. Thus, in the case of the conventional apparatus employing a fixed throttle having a constant sectional area, a damper must individually be equipped in order to control the amount of extracted air, and when a blower is placed in an air duct to a preheater furnace to avoid incomplete combustion because of insufficiency of the extracted air amount, a dust collector must be positioned before the fan to prevent the fan from being damaged by clinker dust. Consequently, the conventional apparatus has disadvantages such as the cost of equipment and power being high and the control of the amount of air being difficult and complicated.

Accordingly, one object of this invention is to provide an apparatus for calcining cement having a throttle in a housing of a kiln inlet, the throttle comprising a quadrilateral flue where at least one of the walls, preferably two walls facing each other, is movable perpendicularly in respect of a gas stream from the kiln to adjust the sectional area of the throttle and to control the flow of the gas stream leaving the kiln, thereby removing the above mentioned disadvantages.

The present invention is illustrated by the following drawings:

FIG. 1 shows an embodiment of the present invention.

FIG. 2 shows a sectional view of a part of the apparatus of this invention employing an adjustable throttle.

FIG. 3a shows a sectional view of the adjustable throttle of FIG. 2 along the line A—A', in which two walls facing each other are movable.

FIG. 3b shows the same sectional view as FIG. 3a, except that in this embodiment only one wall is movable.

Referring to FIG. 1, a combustion gas burnt in a kiln burner 1 passes through a kiln 2, a kiln inlet housing 7 and an adjustable throttle 6, and is introduced into a mixing chamber 5. On the other hand, hot air from a kiln cooler 3 passes through a draft controlling damper 15 in an air duct 12, and is introduced into an auxiliary furnace 4 where fuel burns and cement material from a cyclone 9 is heated and calcined. Exhaust gas and calcined cement material from the auxiliary furnace 4 are introduced into the mixing chamber 5 through an inclined duct. The exhaust gas and the calcined cement material from the auxiliary furnace 4 are mixed with exhaust gas from the kiln 2 in the mixing chamber 5, and the mixture of the exhaust gases is discharged from the system as a uniform exhaust gas by way of cyclones 8, 9, 10 and 11, and an exhaust gas fan 14. Cement material charged through a supplier 13 passes through cyclones 11, 10 and 9, in that order, and enters into the auxiliary furnace 4. The cement material is heat-exchanged with the combustion exhaust gas during the passage through the cyclones. The cement material is rapidly heated and calcined in the auxiliary furnace 4, and the calcined and decarbonated cement material is heat-exchanged again in the mixing chamber 5 with exhaust gas from kiln 2. The cement material thus treated enters into the kiln 2 by way of cyclone 8.

As can be seen from FIGS. 2, 3a and 3b, at least one of the walls, or preferably two walls facing each other, of the adjustable throttle 6 of this invention are movable perpendicularly with respect to the gas stream from the kiln and substantially parallel to the kiln.

For example, referring to FIG. 3a, walls X and X' are movable perpendicularly in respect of a gas stream along fixed walls Y and Y' by means of a screw and the like.

Referring to FIG. 3b, wall X only is movable, while walls Y, Y' and Y'' are stationary.

The length and the width of the movable wall are designed so that the ratio of length/width ($l/d$) may be in the range of 1.5 – 0.3. The throttle as designed in the above mentioned manner prevents cement material from dropping through the throttle, and facilitates (a) mixing combustion gas from the kiln 2 with the cement material and combustion gas from auxiliary furnace 4 and (b) heat exchange between the cement material and the combustion gases in mixing chamber 5.

The cement-calcining apparatus having the above-mentioned throttle 6 of this invention which can control the amount of combustion exhaust gas from the kiln 2 by adjusting its movable walls, thereby making a good balance between the exhaust gas draft from the kiln and combustion exhaust gas draft from auxiliary furnace 4, provides the following effects:

a. The degree of combustion in the kiln 2 and the auxiliary furnace 4 can be optionally controlled by a preheater exhaust gas fan only.
b. The apparatus can be economically operated without increasing the draft resistance of the whole system.
c. It is possible to operate the apparatus corresponding to various loads stably from the start of kindling to normal operation.
d. Hot air can be economically extracted from the kiln cooler 3 to the auxiliary furnace 4 without fixing a blower in the air duct 12.
e. The amounts of combustion gases of the kiln 2 and the auxiliary furnace 4 can be controlled depending on the burning ratio between the two, and highly efficient combustion and operation are possible by determining the amount of oxygen at the end of the kiln and keeping the oxygen concentration constant, particularly at a low oxygen concentration.
f. In connection with the above paragraph, (e), it is possible to restrict the formation of $NO_x$ to a minimum by operating the combustion in the kiln at a low oxygen concentration.
g. It is possible to make a stable operation of a high thermal efficiency for the whole system by means of a controlling system in which the oxygen concentration is determined at the end of the kiln and the oxygen concentration is kept constant by automatically adjusting the throttle. The operation thus controlled makes the formation of $NO_x$ responsible for air pollution a minimum.

What we claim is:

1. An apparatus for calcining suspended cementatious material, said apparatus comprising:

material feed means for feeding said cementatious material to be calcined into said apparatus;

at least one first cyclone preheating means adapted to receive and heat said material from said feeding means;

auxiliary furnace means connected to said first cyclone means adapted to receive said material from said first cyclone means for heating and calcining said preheated material entering thereinto from said first cyclone means;

kiln means for producing combustion gas, said kiln means having an inlet thereinto;

mixing chamber means connected between said inlet to said kiln means and said auxiliary furnace means for mixing said heated material from said auxiliary furnace with said combustion gas from said kiln means;

throttling means between said inlet to said kiln means and said mixing chamber means for adjusting the amount of combustion gas entering said mixing chamber means from said kiln means, said throttling means comprised of a quadrilateral flue having at least one movable wall for adjusting the cross-sectional area of said flue;

at least one second cyclone means connected to said mixing chamber means for receiving said heated material and combustion gas from said mixing chamber and for separating said material from said combustion gas, said second cyclone means further connected to the inlet of said kiln means for directing said separated and heated material thereinto and connected to said first cyclone means for directing said combustion gas separated from said heated material thereinto; and exhaust means connected to said first cyclone means for drawing the combustion gas from said second cyclone means through said first cyclone means and out of said apparatus, whereby the combustion gas passing through said first cyclone means exchanges heat with and preheats said material also passing through said first cyclone means toward said auxiliary furnace.

* * * * *